UNITED STATES PATENT OFFICE.

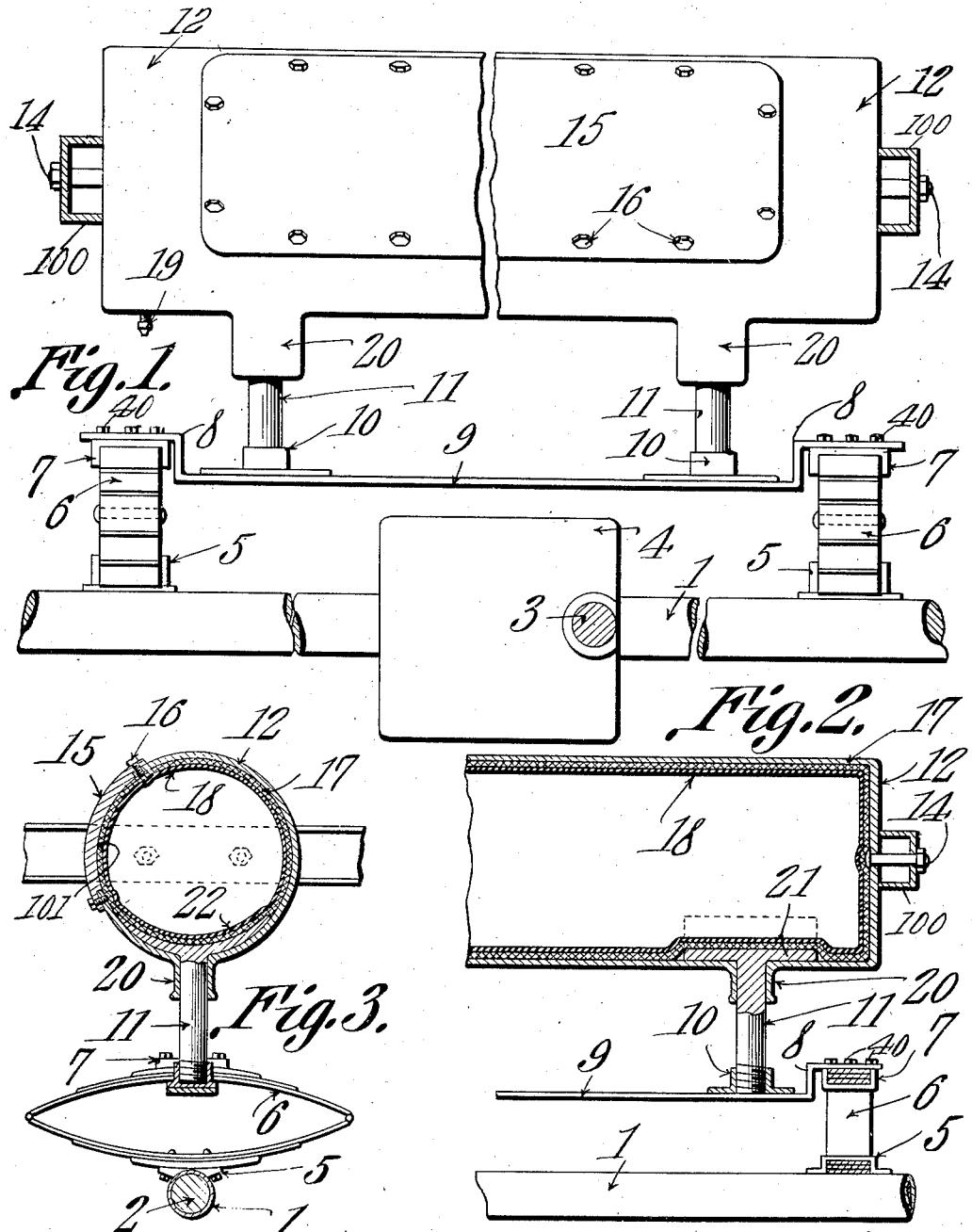

JEW GARLICK, OF PATERSON, NEW JERSEY, ASSIGNOR OF ONE-HALF TO HARRY U. GARLICK, OF PATERSON, NEW JERSEY.

RESILIENT CUSHION FOR REAR AXLES.

1,016,326.  Specification of Letters Patent.  Patented Feb. 6, 1912.

Application filed January 25, 1910. Serial No. 540,007.

*To all whom it may concern:*

Be it known that I, JEW GARLICK, a citizen of the United States, residing at Paterson, in the county of Passaic and State of New Jersey, have invented a new and useful Resilient Cushion for Rear Axles, of which the following is a specification.

It is the object of this invention to provide a resilient element for supporting a vehicle body upon the axle of the vehicle, the construction being such that an inflatable pneumatic element may constitute the resilient portion of the device; the construction being such that the invention may be applied, primarily, although not necessarily, to the rear axle of an automobile, or other power driven vehicle.

With the above and other objects in view, the invention consists in the novel construction and arrangement of parts hereinafter described, delineated in the drawings, and claimed, it being understood that changes, properly falling within the scope of what is claimed, may be made without departing from the spirit of the invention.

Similar numerals of reference are employed to denote corresponding parts throughout the several figures of the drawings.

In the accompanying drawings,—Figure 1 is an elevation of my device; Fig. 2 is a fragmental longitudinal section, parts being shown in elevation; and Fig. 3 is a transverse section, parts being shown in elevation.

In the accompanying drawings, the axle of a vehicle is shown, the same being, in the present instance, the rear axle thereof. This axle consists of a tubular casing 1, in which is commonly journaled for rotation, the shaft 2, with which the wheels of the vehicle, are immediately connected. This member 2 is actuated ordinarily, by a rectangularly disposed drive shaft 3, and this drive shaft 3 is connected with the member 2 within a boxing 4, carried by the casing 1.

Any desired arrangement may be made for supporting the resilient portion of the device subsequently described. In the present instance, by way of illustration, I have mounted upon the casing 1, adjacent its ends, clips 5, adapted to receive and to secure, springs 6, carrying upon their upper sides, other clips 7, which are adapted to hold the ends of a beam 8, which, in its intermediate portion, is depressed slightly below the upper faces of the spring 6, as denoted by the numeral 9. The ends of the beam 8 are secured to the clips 7 by means of bolts 40, or other securing devices, adapted to a like end. Located intermediate the ends of the beam 8, are spaced, upstanding sockets 10, adapted to receive, by threading or otherwise, standards 11. An inclosing member for the resilient element, is provided, the same, in the present instance, consisting of a cylinder or case 12, fashioned, if desired, from metal, and disposed longitudinally of the casing 1 above the same. This cylinder 12 carries, at its ends, suitable supporting devices 14, whereby the frame 100 of the vehicle may be connected with the cylinder 12. In the side face of the cylinder 12, there is a substantially vertical opening 101, through which an inflatable bag or tube 18 may be inserted, without disturbing the connections between the cylinder 12 and the axle and the frame of the vehicle, closed by means of a lid 15, held in place upon the cylinder 12 by means of bolts 16, or other retaining devices adapted to a like end. An inflatable bag is located within the cylinder 12, the lid 15 ordinarily being removed in order that the inflatable bag may be placed within the cylinder 12. This inflatable bag consists of an outer canvas tube 17, within which is inclosed a resilient tube 18, the latter tube being preferably, though not necessarily, fashioned from rubber. In order that the inner tube 18 may be blown up, a nipple 19, communicating with the tube 18, is extended through the wall of the cylinder 12, the nipple being located, in the present instance, relatively near to one end of the cylinder.

At spaced points upon the lower surface of the cylinder 12, there are tubular sleeves 20, in which the standards 11 are adapted to reciprocate. Each of the standards is provided with a concavo-convex head 21, located between the cylinder 12 and the outer bag. This head is curved transversely of the tube 17 with which it is in contact, in order to bear properly, through a relatively large area, against the said tube.

In practical operation, the supporting devices 14 connect the body of the vehicle with the cylinder 12, the weight of the vehicle body thus causing the cylinder to be depressed. As the cylinder 12 is thus depressed, under the weight of the vehicle body, the standards 11 will reciprocate in the sleeves 20, causing the curved faces 22 of the heads 21 to bear against the tubular element 17, the same yielding, under the weight of the vehicle, and rendering pneumatic tires or resilient wheels of any construction unnecessary.

From the foregoing it will be seen that I have provided a yieldable supporting element for a vehicle body, so constructed that it may be readily connected with the rear axle of a vehicle, or other power driven vehicle, without in any way interfering with the driving mechanism which is commonly carried upon the rear axle of such a structure.

The sleeves 20 with which the case 12 is provided, are adapted to be received by the sockets 10, when the bag is deflated. Thus, the weight is thrown upon the springs. The engagement between the sleeves 20 and the sockets 10, serves to space the case apart from the ends of the bar 8, so that the nipple 19 is accessible, to inflate the tube 18. Moreover, this contact between the elements 20 and 10 serves to space the case 12 apart from the ends of the beam 8, so that the securing elements 40 may be manipulated, to remove the beam 8 from the spring 6 when the member 18 is deflated.

Having thus described the invention, what is claimed is:—

The combination with a vehicle axle and a vehicle frame, of a horizontal cylinder disposed above, and parallel to, the axle, the cylinder being of sufficient length to extend entirely across the vehicle; means upon the ends of the cylinder for engaging opposite side members of the frame; the cylinder having spaced, depending sleeves; standards mounted to slide in the sleeves and having heads disposed within the cylinder, transversely of the same, the heads being concavo-convex, to conform to the inner surface of the cylinder; means for connecting the standards with the axle; an inflatable bag in the cylinder, and fitting in the concaved heads; the cylinder having a substantially vertical opening in its side, through which the bag may be inserted, from one end of the vehicle; and a closure for the opening, the closure being freely removable, without disturbing the connections between the cylinder, the axle and the frame.

In testimony that I claim the foregoing as my own, I have hereto affixed my signature in the presence of two witnesses.

JEW GARLICK.

Witnesses:
O. E. DOYLE,
GEO. B. PITTS.